United States Patent Office 3,681,286
Patented Aug. 1, 1972

---

3,681,286
FIBER GLASS LAMINATES CONTAINING FURFURYL RESIN BINDER
Lloyd H. Brown, Crystal Lake, and David D. Watson, Barrington, Ill., assignors to The Quaker Oats Company, Chicago, Ill.
No Drawing. Original application May 31, 1968, Ser. No. 733,282. Divided and this application Nov. 23, 1970, Ser. No. 92,228
Int. Cl. C08f 27/18
U.S. Cl. 260—67 FA
2 Claims

ABSTRACT OF THE DISCLOSURE

Glass fibers are bound with a furfuryl alcohol-formaldehyde resin in a binder containing furfural, a high catalyst level, and a silane. The resulting article is cured at temperatures below 100° C.

CROSS-REFERENCES TO RELATED APPLICATIONS

This application is a division of our previous application Ser. No. 733,282, filed May 31, 1968, now Patent No. 3,594,345 entitled "Fiber Glass Laminates Containing Furfuryl Resin Binder."

BACKGROUND OF THE INVENTION

The use of furfuryl alcohol-derived resins as binders in glass fiber laminates is well known. These laminates are appreciated in the industry because of their high degree of chemical resistance. Consequently laminates bound with furfuryl alcohol-derived resins find application in the fabrication of industrial vessels which are intended to contain highly corrosive chemicals such as acids and bases. However, the laminates which have been produced by heretofore available methods have not particularly distinguished themselves with regard to structural strength. Consequently these laminates often found use in conjunction with other high structural strength materials. It is an object of this invention to provide a method for producing glass laminates bound with furfuryl alcohol-derived resin, which laminates have high chemical resistance and moreover have structural strengths which have been heretofore unavailable with such resins.

SUMMARY OF THE INVENTION

The method of this invention utilizes a resinous mixture of a specially prepared furfuryl alcohol-formaldehyde resin and furfural. We have discovered that the use of this special binder mixture, in conjunction with unusually high catalyst levels and in conjunction with the presence of a silane, as a binder for glass-containing materials, provides structural strength heretofore unavailable, when curing temperature is maintained below the boiling point of water. The special binder used in this invention comprises a homogeneous mixture of (A) Furfuryl alcohol-formaldehyde resin having a viscosity between 5,000 and 200,000 cps., said resin having been prepared by the steps of acid resinification of furfuryl alcohol and formaldehyde in a molar ratio of between 0.25 and 1.0 mole of formaldehyde per mole of furfuryl alcohol, neutralizing the catalyst, and removing substantially all water by distillation, and (B) Furfural in an amount between 5 and 25 percent by weight based on the weight of the composition, the resulting composition having a viscosity between 200 and 5,000 cps. at 77° F.

We have discovered that when this binder mixture is used in conjunction with high levels of catalyst, e.g. between 2 and 7 percent, preferably between 2.0 and 5.5 percent, said catalyst being selected from the group consisting of paratoluene-sulfonic acid, maleic acid, phosphoric acid, and acids of similar strength and also in conjunction with either vinyl- or amino-silane, objects of this invention are achieved provided cure temperature is maintained below the boiling point of water. These objects include production of glass filled and/or reinforced materials having excellent structural strength, chemical resistance, and heat stability. The flame resistance of structures produced in accordance with preferred embodiments of this invention is also excellent. Moreover, shrinkage during cure is within ranges which have been heretofore reported for epoxy-bound laminates.

DESCRIPTION OF PREFERRED EMBODIMENTS

In this invention we contemplate the use of acid curable binder composition comprising a homogeneous mixture of (A) A furfuryl alcohol-formaldehyde resin having a viscosity between 5,000 and 200,000 cps., said resin having been prepared by the steps of acid resinification of furfuryl alcohol and formaldehyde in a molar ratio of between 0.25 and 1.0 mole of formaldehyde per mole of furfuryl alcohol, preferably between 0.5 and 1.0 molar ratio, neutralizing the catalyst and removing substantially all of the water produced by said acid resinification, and (B) Furfural in an amount between 5 and 25 percent preferably between 10 and 20 percent by weight based on the weight of the composition, said binder composition having a viscosity between 200 and 5,000 cps. at 77° F. preferably between 500 and 3,000 cps.

It is preferred that in the production of the curable binder composition which is used in accordance with this invention, that furfuryl alcohol monomer be removed from the furfuryl alcohol formaldehyde resin, e.g. by reduced pressure distillation after neutralization. We have discovered that furfuryl alcohol monomer contributes greatly to the development of an undesirable exotherm within the fabricated laminate and to shrinkage. These undesirable attributes are minimized in accordance with this invention by initially preparing viscous resins, removing the furfuryl alcohol monomer therefrom, and dissolving the resulting viscous resins in furfural in amounts sufficient to provide between 5 and 25 percent furfural, preferably between 10 and 20 percent, by weight based on the weight of the resulting composition. We have discovered that furfural is an excellent solvent for these resins as well as for the resins which are conventionally used as a binder for glass fiber and cloth. Moreover we have found that substitution of furfural for the furfuryl alcohol monomer in the furfuryl alcohol formaldehyde resins leads to very little shrinkage providing the amount of furfural is held within the specified limits. Moreover, we have discovered that the furfural used in accordance with this invention becomes incorporated into the cured structure.

As indicated above, the ratio of formaldehyde to furfuryl alcohol in the resin production method can be between 0.25 and 1.0 mole. Above this level odor becomes a serious problem during subsequent use of the resin, and below this specified level reactivity falls off rapidly. While it is possible, under extremely carefully controlled conditions, to produce laminates with furfuryl alcohol resins which contain no formaldehyde at all, the handling properties of such materials were found to be poor and the resins could not tolerate enough acid to achieve a good cure at high strength without developing too much exotherm.

While we do not want to be bound by any theories we believe that the extremely high activity of furfuryl alcohol resin systems heretofore used in the fabrication of laminates led to the development of excessive exotherms thereby causing the resulting laminate to be weakened by splitting or separating of laminate layers due to steam and gas evolution. It is to be noted that in the resinification of furfuryl alcohol-derived resins water is produced. Consequently, based on our intensive research, we now believe that in any method of producing furfuryl alcohol resin bound laminates in which temperatures above the boiling point of water are encountered prior to the substantial curing of the binder, steam is evolved and bubble formation and laminate separation is most likely encountered. Thus it is essential that temperatures above the boiling point of water be avoided prior to substantial cure of the bound article.

In accordance with this invention, we prefer low viscosity materials, preferably around 500 cps. for use in most hand-layup laminate work. We have discovered that the method of this invention leads to considerably less shrinkage and exotherm even when such low viscosity materials are employed. Viscous resins are not particularly suitable in hand layup work insofar as they are not well adapted to wetting of the glass fiber mat. Viscous resins tend to be so tacky that they cause fibers to build up on the roller, and entrained bubbles are almost unavoidable.

However, in some applications, e.g. in filament winding, higher viscosity resins are preferred. For these applications, we prefer binder compositions of this invention which are essentially free of furfuryl alcohol monomer. For such application we prefer to prepare the resin by resinifying the furfuryl alcohol-formaldehyde mixture to the desired viscosity, neutralizing the catalyst, distilling off the water and furfuryl alcohol monomer under reduced pressure and adding furfural to the resulting viscous resin in an amount approximately equal to the amount of the furfuryl alcohol removed. When a 300 gram batch of a resin produced in this manner is catalyzed in a paper cup by the addition of 5% phosphoric acid, the resulting mixture gave a peak exotherm of only 234° F. The resin mixture hardened without foaming or spalling. In comparison to this a similar test with a resin from which the furfuryl alcohol had not been removed gave a peak exotherm temperature of 311° F. During the hardening, the latter material popped and emitted a lot of steam. In contrast to both of these, conventional furfuryl alcohol polymers expand many times during such a test to form a brittle foam, as a result of the copious quantities of steam emitted during the exothermic resinification of the resin.

It will be appreciated by those skilled in the art that the above described paper cup tests are useful insofar as they serve to indicate the relative activity of the resin system employed. When the tested resins are permitted to resinify in thin sheets or under other circumstances in which the evolved heat is dissipated, the test peak temperatures recited above will not be encountered, and the resulting cured resin will not necessarily be in the same condition as the resin cured in accordance with the paper cup tests described above.

The method of this invention can be utilized in conjunction with fibrous glass such as the conventional glass mat or conventional glass cloth; or it can be used in conjunction with fillers such as silica flour. In the following examples, it will be illustrated that the method of this invention can be used in conjunction with the fabrication of laminates produced from glass mats and Fiberglas cloth, and in conjunction with the so-called "gunk" molding processes and extrusion.

CATALYST

The resin composition of this invention is cured by the presence of an acidic catalyst. The preferred catalysts are p-toluenesulfonic (PTSA) and phosphoric acid. For use in accordance with this invention, these acids must be added in the form of diluted solutions. The maximum concentration of solutions of preferred catalyst is 70%; preferred concentration being about 67%. Water and alcohol are the preferred catalyst diluents. Whatever acid is used however must be used in relatively high levels, e.g. between 2 and 7 percent. It is noted that at these levels the catalysts produce an exothermic reaction in the binder resin of this invention. However, it should be noted that the exotherm of this composition is less than the exotherm encountered in most catalyzed polyesters under similar test conditions. However, under the conditions of preparing a laminate in accordance with this invention the resin will be spread in relatively thin layers and will gel smoothly, that is, without expansion or foaming, in a relatively short period of time. The resulting laminates can be stripped, that is, removed from the shaping surface, without external heat, in a period of time ranging from a few minutes to 2 hours. They will cure to a maximum strength in about a month if room temperature curing conditions are provided, or within a few hours if temperatures in the order of 160° F. are provided. An alternative technique for curing the glass-filled or reinforced structures made in accordance with this invention, is the method in which the exterior of the shaped laminate or glass-filled structure is heated to initiate an exotherm at the surface thereof and to cure the surface thereof, the shape being subsequently removed from contact with an external heat source. In this technique the initial exotherm is sufficient to provide useful rapidly curing high temperature conditions throughout the entire laminate or filled shape. Within the limit of an operator's ability to manage the exothermic systems, highest strengths are achieved when highest catalyst levels are employed. Using the method of this invention flexural strengths of 35,000 p.s.i. are achieved using glass mats and flexural strengths in the order of 60,000 p.s.i. are achieved using glass cloth.

Hence, the most highly catalyzed systems, in accordance with this invention are very exothermic. They can be used only in small batches, with cooling, or with some sort of a continuous mixing and cooling device. The actual amount of cooling required is not great, however. For example, if a 250 gram batch of resin is cooled to 70° F., and held at that temperature while catalyst is added, the pot life will be between 10 to 15 minutes without additional cooling. Without any cooling, however, the pot life of a 10 gram batch using the same catalyst is approximately 1 to 2 minutes. Nonetheless, the extremely short pot life of these highly catalyzed systems is entirely practical when the system is used in the preferred method of handling systems of this type, that is, in continuous methods such as those using a spray gun which continuously mixes catalyst and resin in the spray head of the device. Such devices are conventional in the polyester field, and the conventional equipment can be used in this invention.

One outstanding advantage of the paratoluenesulfonic acid catalyst system is that the resulting laminates do not necessarily have to be fully cured before they are put in service. The laminates which are cured with this catalyst continue to cure even when immersed in boiling water. Laminates which had been cured to about 10,000 p.s.i. flexural strength before the test, came up to 17,000 p.s.i. flexural strength after 24 hours immersion in boiling water.

This pattern does not hold true, however, for the phosphoric acid-catalyzed systems. We have not encountered a single instance in which a phosphoric acid-catalyzed structure increased in strength during such a test. For example a laminate which was cured to about 14,000 p.s.i. strength fell off to 9,000 p.s.i. under the same boiling water test. However, when adequately cured, the structures produced in accordance with this invention still appear better with respect to this boiling water test than most general purpose polyesters.

An important advantage of phosphoric acid catalyzed systems is the ease of handling, i.e. management. Although phosphoric acid is used in the same levels as paratoluenesulfonic acid, it provides considerably greater moderation in terms of exothermic reaction. Without cooling, gallon sized batches of the resin containing 5% phosphoric acid (as a 67% solution in methanol) will give a pot life of 30 to 45 minutes. Laminates produced with such a resin can be laid up in layers as thick as one-half inch and then placed directly in an oven without untoward effect. With the oven at 120° F. the resulting laminate can be stripped in less than one hour. If an oven is not available, the laminate may be stripped after standing overnight at room temperature. Laminates produced with the phosphoric acid catalyzed resins of this invention will normally attain strengths of around 25,000 p.s.i. or greater in about a week at room temperature cure.

SILANE FINISH

The presence of reactive silanes, preferably, either vinyl- or amino-silane, is essential in the method of this invention. We prefer the use of substituted silane compounds in which the molecular weight of the silane moiety is less than 500. Glass fiber mats and cloth are conventionally available with silanes on them as finishes because the addition of silanes to the glass fiber appears to be advantageous in the manufacture of the glass fiber product, e.g. mat or cloth. If the glass fiber product utilized in accordance with this invention does not contain a silane finish, it is essential that an effective amount of a substituted silane, e.g. amino-silane or vinyl-silane be added to the resin binder. We have found that addition of a silane in an amount between 0.25 and 3 percent based on the weight of the binder composition is entirely satisfactory in the method of this invention. We find that in the absence of a silane finish even the preferred resins of this invention have poor adhesion to glass. On the other hand addition of the 1% amino-silane to the resin of this invention leads to a binder which tenaciously adheres to glass. For example a laminate laid up on plate glass using the resin of this invention with 1% amino-silane cannot be stripped from the glass without chipping the glass.

It is to be noted that in the manufacture of glass fiber mat it is customary to utilize a relatively small quantity of a dissolving type polyester mat binder. This mat binder causes the glass fibers to adhere to one another thereby maintaining the structural integrity of the mat prior to its use. The mat binder employed is preferably soluble in the resin subsequently used as the laminate adhesive. Generally speaking, glass mats and cloth using any mat binders which are soluble in polyester laminate adhesives are eminently satisfactory for use in accordance with this invention. We have found that most dissolving types of polyester mat binders are very soluble in the special furantype laminate adhesive of this invention. It is preferred that the mat used in accordance with this invention have such an amount of mat binder that it will lose no more than between about 3 and 4 percent by weight when the mat is burned off at 550° C.

We have found that glass fibers which are finished with chromium methacrylate or other non-silane finishes cannot be used in accordance with this invention unless a reactive silane, such as either vinyl- or amino-silane, is added to the resin.

In the following examples and throughout the specification parts refers to parts by weight and percent (or %) refers to percent by weight and temperatures are expressed in degrees Farenheit, unless otherwise indicated.

EXAMPLES

Example 1

This example is intended to illustrate a method of preparing the resin for use in accordance with this invention. Furfuryl alcohol (98 parts), 37% Formalin (40.7 parts) and 10% aqueous oxalic acid (0.78 part) were mixed at room temperature in a 15-gallon stainless steel kettle equipped with a steam jacket, stirrer, thermometer well, and reflux condenser. The pH of the resulting solution measured 1.95. The batch was heated over a period of 18 minutes to a temperature of 94° C., at which point mild reflux began. At this point the hot cup viscosity as measured by a Cenco consistency cup No. 27145 was 37.0 seconds. The batch refluxed at 98–100° C. for a period of about 88 minutes at which time it gave a hot cup viscosity of 47.2 seconds. The reaction mass was neutralized with 0.39 part of triethanolamine to pH 6.0. At this point 2.5 parts of 40% urea solution were added, and the setup was changed to allow vacuum distillation. The batch was distilled 130 minutes at temperatures up to 95° C. and pressures down to 35 mm. Hg. The undiluted viscosity at 25° C. was then 12,900 cps. After dilution with 24 parts of furfural, a viscosity of 445 cps. was obtained. Yield was 119 parts after the dilution.

Example 2

The purpose of this example is to illustrate another method of preparing a preferred binder for use in accordance with this invention. A relatively furfuryl alcohol monomer-free version of the resin produced in accordance with Example 1 was made by a similar procedure, except that cup viscosity was carried from 42.8 seconds to 46.6 seconds, and final distillation required 5 hours at kettle temperatures up to 123° C. and pressures down to 35 mm. of Hg. About 21.5 pounds of furfuryl alcohol were collected in the receiver during the last part of the distillation. The viscosity of the resulting resin at this point was 100,000+ cps. Total resin yield was 75.0 parts, and 25.5 parts of furfural were then added to give a total product yield of 100.5 parts. Viscosity after dilution was 1,600 cps.

Example 3

The purpose of this example is to illustrate a method of preparing a glass fiber mat laminate in accordance with this invention. A long Mylar sheet was laid out on a flat working surface. The resin of Example 1 was sprayed onto the Mylar sheet using a conventional resin sprayer of the type which mixes resin and catalyst in the spray head, and which is normally used in connection with polyester laminating. The catalyst pressure was adjusted to provide PTSA in an amount equivalent to approximately 6% by weight based on the weight of the resin. In the apparatus used, the catalyst and the resin were mixed in the spray head and a fraction of a second elapsed prior to application of the resulting catalyzed mixture on the Mylar sheet. It is noted that with this particular resin this amount of catalyst is sufficient to initiate an extremely vigorous curing reaction. The resulting coating was permitted to cure for approximately 10 minutes during which time the coating gelled to form an even sheet or layer. No foaming or blistering was observed. Such a coating is referred to as a "gel coat" in the laminating art. One of the purposes of the highly catalyzed gel coat is to provide a smooth finish at the exterior of the resulting laminate. A consideration which is perhaps more important to the fabricator is the fact that the highly catalyzed gel coat cures much faster than the mass of the laminate would normally be permitted to cure. Consequently the laminate structure can be stripped from the gel coat-contacting surface in a much shorter time than an equivalent laminate to which a gel coat has not been incorporated. After the gel coat cured a thin layer of the resin produced in accordance with Example 1 was sprayed on top of the gel coat. During this spraying, however, the pressure on the catalyst system was reduced so that the amount of catalyst admixed with the resin was sufficient to provide approximately 3% of PTSA catalyst. A mat of chopped strand glass (1½ oz.) was laid upon the wet resin. The mat was rolled into the wet layer of resin with the use of a resin roller. This device is a conventional laminating tool consisting of a plurality of adjacent circumferentially grooved aluminum discs freely rotatable about a common axle. As a result of rolling the glass mat with the resin roller the mat is worked down into the wet resin layer until the resin completely wets all of the glass mat. The glass mat used in this example is designated as M–700 and is an E glass having a vinyl-silane finish and a soluble polyester resin binder. When the first layer of glass mat was thoroughly wetted as a result of the rolling operation, the resulting materials were again sprayed with the resin produced in accordance with Example 1 to which sufficient PTSA was added during the spraying to again provide approximately 3% catalyst in the resin layer. Again the steps of laying-on the mat, rolling the mat into the resin, spraying a third layer of resin adding a third mat of glass were carried out so that 3 glass mats were worked into 3 alternate layers of resin. The resulting laminate was permitted to cure for approximately one-half hour at room temperature after which it was stripped from the Mylar sheet. The stripped laminate, was placed into a 160° F. curing oven for approximately 4 hours. After this cure the cured laminate was found to possess a flexural strength of about 14,000 p.s.i. The laminate was returned to the 160° oven for a total cure of approximately 24 hours at which time it was removed from the oven and again subjected to a test for flexural strength. It was determined that the flexural strength was 24,550 p.s.i. at this point. The remaining laminate was divided into two portions and these portions were subjected to different heat treatment. The first portion was again placed in the 160° oven and permitted to remain there for a period of 30 days. After this heat treatment it was found that the flexural strength of the laminate so treated was 33,500 p.s.i. The second portion of the laminate produced in this example was placed in a heat treating oven at 230° F. and permitted to remain therein for 30 days. After 30 days it was found that the flexural strength of the sample so treated was 35,100 p.s.i. The latter test shows that temperatures in excess of the boiling point of water can be used *after* substantial curing of the binder.

Example 4

The purpose of this example is to illustrate the effect of extremely high temperatures upon the flexural strength of the laminate produced in accordance with Example 3. A laminate produced by the procedure of Example 3 was subjected to 24 hours cure at 160° F., at which time it was found to have a flexural strength of approximately 25,000 p.s.i. The laminate was divided into three portions. Each of the portions was placed in a different oven overnight. The ovens used had temperatures of 635° F., 500° F. and 400° F. respectively. After 16 hours residence in their respective ovens the portions were found to have a flexural strength of 8,230, 8,230 and 20,100 respectively. The sample which was subjected to 400° F. heat treatment was returned to the 400° F. oven for a total treatment of 40 hours at that temperature at which time it was found to have a flexural strength of 16,300. After this sample was subjected to a total of 110 hours at 400° F. the flexural strength was found to be 8,180 p.s.i.

Example 5

The purpose of this example is to illustrate the fabrication of a laminate in accordance with this invention using glass cloth. A gel coat was formed on a Mylar sheet as set forth in Example 3 then a layer of resin was spread on the gel coat. This resin was produced in accordance with Example 2, but modified by the addition of 1% amino-silane thereto. Also, PTSA was added in sufficient amount to provide 3% concentration of the acid based on the weight of the resin. A sheet of glass cloth was laid on the liquid resin. This cloth was a 181 glass cloth which had been heat cleaned. The cloth was worked into the wet resin using a conventional resin roller. The steps of spreading resin, laying a sheet of glass cloth, and working the sheet into the resin was repeated ten times to provide eleven alternate layers of resin and cloth. A thin top-layer of resin was added to the uppermost resin-wetted glass cloth. After an overnight cure at room temperature the resulting laminate was stripped from the Mylar sheet. Subsequent analysis revealed that the resulting ⅛″ laminate contained 55 to 60 percent glass. After curing for two days at room temperature the laminate was found to have a flexural strength of 20,000 p.s.i. A second sheet of laminate produced in accordance with this example was placed in a 160° F. oven after it was stripped and permitted to heat cure for four hours at 160° F. and was subsequently cured at 210° F. overnight. After this curing treatment the laminate was found to have a flexural strength of 62,100 p.s.i.

Example 6

The procedure of Example 5 was repeated using a glass cloth pre-treated with silane. The binder was a mixture of a resin produced as in Example 1, except that a 0.5 molar ratio of formaldehyde to furfuryl alcohol was employed, and the final mixture, containing 21% furfural, had a viscosity of 750 cps. The catalyst used in the laminating step was 67% phosphoric acid in methanol. Sufficient catalyst was incorporated to provide 5% phosphoric acid. The laminate was cured overnight at room temperature, then 24 hours at 165° F. The cured laminate exhibited a tensile strength of 56,600 p.s.i.

Example 7

The procedure of Example 5 was again repeated in two separate tests except that in the first test no amino-silane was added to the resin. In this first test the resulting laminate was cured for four hours at 160° F. and overnight at 210° F. The resulting laminate was found to have a flexural strength of 33,500 as compared to the 62,100 achieved when 1% amino-silane was added. In the second test of this example the procedure of the preceding numbered example was again repeated except that the catalyst level was 5% PTSA instead of the 3% of that example. After a cure of four hours at 160° F. and overnight at 210° F. the resulting laminate was found to have a flexural strength of 60,000 as compared to 62,100 of Example 5. This illustrates that the additional 2% PTSA over the preferred 3% level provided no additional strength advantage in the fabrication of the glass cloth laminates.

Example 8

The purpose of this example is to illustrate the fabrication of a glass mat laminate in accordance with this invention and to illustrate the effect of excessively high curing temperature on the strength of the resulting product. The resin produced in accordance with Example 2 was admixed with sufficient PTSA to provide 3% acid based on the weight of the resin. A thin layer of the resulting catalyzed resin was distributed over the surface of the Mylar sheet and a 2 ounce chopped strand glass mat having a vinyl-silane finish was laid thereon. The glass mat was thoroughly worked into the resin layer using a conventional resin roller. A second layer of resin was distributed over the resin wetted glass cloth and a second ply of 2 ounce glass mat was worked into the second resin layer. These steps were repeated a third time to provide a three-ply laminate approximately one-eighth inch thick which was removed from the Mylar sheet after approximately 1 hour. After two days cure at room temperature the laminate was found to have a flexural strength of 24,100 p.s.i. The cured laminate was found to contain 25% to 30% glass. In a separate test a laminate produced in accordance with this example was subjected to a 24 hour cure at 165° F. instead of the 2 day cure at room temperature. In this test the flexural strength was found to be 28,100 p.s.i. In another repeat of this example except that the curing treatment of 16 hours at room temperature followed by a post-cure of overnight at 250° F. was employed instead of the curing treatment used in the preceding test of this example the flexural strength was found to be 21,000 p.s.i.

Example 9

The purpose of this example is to illustrate the use of the resin produced in accordance with Example 2 using phosphoric acid as a catalyst. The resin produced in accordance with Example 2 was admixed with sufficient phosphoric acid (as a 67% solution in methanol) to provide 5% of the acid catalyst based on the weight of the resin. The procedure employed in Example 8 was repeated to provide a three-ply ⅛ inch laminate of which contained 25 to 30 percent glass. After 7 days cure at room temperature the resulting laminate was found to have a flexural strength of 24,000 p.s.i. When a laminate produced by the same method was permitted to cure for 24 hours at 165° F. instead of the room temperature cure it was found that the resulting product had a flexural strength of 29,500 p.s.i.

Example 10

The purpose of this example is to illustrate the effect of various concentrations of phosphoric acid on the flexural strength of laminates produced in accordance with this invention when the resin produced in accordance with Example 1 is used. Two separate portions of the resin produced in accordance with Example 1 were admixed with phosphoric acid in sufficient amounts to provide 5% and 7½% phosphoric acid, respectively, based on the weight of the resin. In the tests of this example a layer of the resins is spread on a Mylar sheet and 2 ounce glass mat is worked into this layer of resin. It is noted that the glass mat used in this example contained thereon a vinyl-silane finish. The steps were repeated to provide a three-ply ⅛ inch thick laminate as in Example 8. The laminate was stripped from the Mylar after approximately two hours at room temperature. In each of these tests a portion of the laminate so produced was cured for seven days at room temperature and a second portion of the laminate was cured for 24 hours at 165° F. The laminate produced with the 5% catalyst resin showed a flexural strength of 26,400 p.s.i. after the seven day room temperature cure and 31,300 p.s.i. after the elevated temperature cure. The laminate produced with the 7½% catalyst resin mixture was found to provide a flexural strength of 22,000 p.s.i. after seven day room temperature cure and 27,600 p.s.i. after 24 hours at 165°.

Example 11

The purpose of this example is to illustrate a novel cure technique and the use of this invention in conjunction with silica flour. The resin produced in accordance with Example 1 (250 parts of resin 404-194), 67% methanolic phosphoric acid (5% $H_3PO_4$ based on the weight of the resin), 650 parts of silica flour, and 100 parts of chopped glass fibers were blended to make a stiff putty-like material. It is noted that the glass fibers contained thereon a vinyl-silane finish. The resulting putty-like material was shaped cold into tensile strength test biscuits which were divided into two test groups. The biscuits in the first test group were cured on a hot plate at 170° C. (and in the second test group at 220° C.) for a period of time between 10 to 30 seconds. It is noted that this amount of time was sufficient merely to heat the outermost lower surface of the stiff putty-like material. However when removed from the hot plate the biscuits had a tough "skin" on the bottom while the unheated top was still cold. Exothermic heat was observed to proceed through the mass of the specimen and they hardened, i.e. cured, slowly without further external heating. At no time was any temperature at any point in any biscuit of these tests observed to be above 212° C.

Example 12

The purpose of this example is to illustrate the cure technique used in Example 11 in conjunction with glass fiber laminate. Various samples of three-ply Fiberglas mat laminate were produced in using the resin of Example 1 which was modified by the addition of 5% phosphoric acid and a mat of chopped glass fibers which contained a vinyl-silane finish. Instead of permitting the laminate to cure at room temperature prior to stripping from the Mylar sheet the laminate was subjected to contacting of temperatures of 140 to 170° C. at the upper surface thereof for periods of time of about 30 seconds. Exothermic heat was observed to move through the cross section of the resulting laminate with result that the entire mass was cured by the exothermic heat generated by the polymerization of the resin. It should be noted however that the amount of heat evolved in these tests was insufficient to provide temperatures above the boiling point of water.

Example 13

The purpose of this example is to illustrate the excellent chemical resistance provided by the laminates produced in accordance with this invention. In a series of four tests various resins were catalyzed with various concentrations of PTSA or phosphoric acid. The resin data is summarized in Table 1. Three ply laminates were produced as in Example 8 and subjected to post cure, i.e. cure after stripping, at such temperatures and for such times as are summarized in Table 1. After the cure, the flexural strength set forth in Table 1 in the column headed "Flex. Str." were observed. Each of these laminates were then cut into strips which were then subjected to the action of a boiling liquid for 24 hours in various tests. Water, acetone, 10% sodium hydroxide, and 35% sulphuric acid were used as the boiling solvents. The flexural strength (tested wet) was determined after 24 hours immersion in the boiling solvent. The strengths observed are summarized in Table 1.

TABLE I.—CHEMICAL RESISTANCE
All tests 24 hours at boiling point—tested wet

| Run No. | Percent cat. | Postcure Time | Postcure Temp. | Flex. str., p.s.i. | Water flex., p.s.i. | Acetone flex., p.s.i. | 10% NaOH flex., p.s.i. | 35% $H_2SO$ flex., p.s.i. |
|---|---|---|---|---|---|---|---|---|
| 12-1 | 2.5 T | 24 hrs | 165 | 30,620 | 21,720 | 30,420 | 24,200 | 24,580 |
| 12-2 | 5 P | 2 days | 175 | 27,800 | 15,350 | | 14,225 | 19,975 |
| 12-3 | 1.8 T | 25 days | 75 | 18,940 | 16,420 | | | |
| 12-4 | 5 P | 35 days | 75 | 24,425 | 14,080 | | | |

NOTE.—P=$H_3PO_4$. T=PTSA.

Example 14

The purpose of this example is to further illustrate the chemical resistance of laminates produced in accordance with this invention and to compare it to the chemical resistance of similar laminates not produced in accordance with this invention. The data obtained as a result of this series of tests is summarized in Table II. In the column headed "Composition Description" the first number in each instance indicates the number of moles of formaldehyde present per mole of furfuryl alcohol monomer at the beginning of the initial acidic resinification which was carried out under conditions substantially the same as those set forth in Example 1 above. In each instance in which the letter F is included in the description column the resulting resin was diluted with 15 parts of furfural per 100 parts of resin. It is noted that tests 14–8 through 14–11 utilized binder compositions which were not diluted with furfural in accordance with this invention. In runs 14–14 and 14–15 the "(25%)" indicates that furfural was present in an amount of 25 parts of furfural per 100 parts of resin. In runs 14–8 and 14–9 styrene rather than furfural is used to dilute the pre-resinified binder composition. Runs 14–10 and 14–11 utilized a binder composition which contained no diluent whatsoever. The time set forth in the column headed "Cure Cond. 160° F." represents the amount of cure after the laminate was stripped.

in which the flame propagates along the laminate strip in the last described test even though the laminate retains its structural integrity.

The laminates produced in accordance with this invention appear to be very stable with respect to heat. For example, a mat laminate with an initial flexural strength of 29,400 had after 30 days at 110° C. a flexural strength of 30,700. By way of comparison commercial bisphenol A fumarate polyester laminates have been reported (R. F. Register, proceedings of the 22nd Annual Meeting of the Reinforced Plastics Division, SPI, Section 16–D) to lose an average of 19% of their strength from an initial average of 16,250 p.s.i. in 2 months at 110° C.

TABLE II

| Run number | Composition description | Cure cond., 160° F. | Orig. flex., p.s.i. | Acetone flex.,[e] p.s.i. | Percent loss or gain p.s.i. | $H_2O$ flex.,[f] p.s.i. | Percent loss or gain p.s.i. |
|---|---|---|---|---|---|---|---|
| 14-1 | 0.25F [a] | 9 hrs | 16,350 | 14,975 | −8.4 | 14,950 | −8.57 |
| 14-2 | 0.25F | 25 hrs | 18,850 | 19,550 | +3.71 | 14,600 | −22.6 |
| 14-3 | 0.375F | 9 hrs | 18,075 | 18,975 | +4.98 | 16,150 | −10.65 |
| 14-4 | 0.375F | 25 hrs | 17,300 | 19,825 | +14.6 | 17,700 | +2.31 |
| 14-5 | 0.5F | 9 hrs | 20,425 | 22,575 | +10.55 | 16,700 | −18.25 |
| 14-6 | 0.5F | 25 hrs | 21,075 | 23,150 | +9.85 | 17,000 | −19.3 |
| 14-7 | 0.5F | 4 hrs | 17,750 | 13,300 | −29.1 | 16,750 | −5.64 |
| 14-8 | 0.5S [b] | 9 hrs | 18,750 | 21,225 | +19.55 | 15,800 | −15.7 |
| 14-9 | 0.5S | 25 hrs | 20,600 | 15,175 | −26.3 | 15,750 | −23.5 |
| 14-10 | 178 [c] | 9 hrs | 20,050 | 13,550 | −32.4 | 16,200 | −19.2 |
| 14-11 | 178 | 25 hrs | 20,850 | 15,425 | −26.0 | 17,050 | −18.2 |
| 14-12 | 0.5F-81 [d] | 4 hrs | 15,950 | 19,925 | +24.9 | 14,450 | −9.4 |
| 14-13 | 0.5F-81 | 25 hrs | 19,525 | 22,100 | +13.2 | 17,950 | −8.07 |
| 14-14 | 0.5F(25%)-81 | 4 hrs | 15,850 | 19,825 | +25.1 | 17,100 | +7.90 |
| 14-15 | 0.5F(25%)-81 | 25 hrs | 21,200 | 25,850 | +21.9 | 17,850 | −15.8 |

[a] 0.25F means 0.25 mole of $CH_2O$ per mole of FA, cut back 15% with furfural.
[b] S = Styrene.
[c] Resin 398-178 undiluted.
[d] Resin 398-81 (79,000 cps.) cut back with 15% furfural.
[e] Flexural strength (p.s.i.) after 66 hours in boiling acetone.
[f] Flexural strength after 69 hours in water at 200–210° F.

Except for those tests in which the resins were obviously under-cured, the laminate's physical appearance was such that there was no apparent effect as a result of the residence in the boiling medium, and the solutions from which the test strips were removed remained light colored and clear. In similar tests samples were retained in boiling water for one week and the results were not significantly different for the three day values reported above in Table I. In all of the tests described in the two preceding numbered examples one-inch by three-inch specimens were employed, with edges unprotected. It is noted that the SPI standard test for chemical resistant process equipment calls for protecting the edges of fiber glass laminates during similar tests.

We have found that all the laminates produced in accordance with this invention would be rated as "nonburning" by ASTM 635–63. However, those made with PTSA are not as fire resistant as the resins produced using phosphoric acid as the catalyst.

In another laboratory test a three-inch by fourteen-inch strip of laminate prepared in accordance with this invention (with phosphoric acid catalyst) is suspended at an angle in a hood. The lower tip of the strip is positioned so that the full flame of a 3/8" diameter Bunsen Burner was in direct contact with the strip. After a full flame was played on the under surface of the strip for about two hours, at the front of the hood and the bottom of the laminate, it was observed that virtually no smoke had been evolved, that the fire which occurred initially in the laminate in the immediate vicinity of the flame had extinguished itself in two or three minutes and that the burned area after a period of three hours was restricted to a radius of about two inches in the immediate vicinity of the flame. The burner flame never penetrated the laminate, and the latter retained its structural integrity. It must be emphasized that this type of result is obtained only when phosphoric acid catalyst is used in accordance with this invention. Use of PTSA as the catalyst for the binder composition results in a product At 400° F., when protected from oxidation, laminates produced in accordance with this invention lose strength very slowly. Over a period of 110 hours the strength drops on an average to about 8,000 p.s.i. and appears to level out at that value. The same phenomenon as observed overnight at 635° F.

Example 15

The purpose of this example is to illustrate the shrinkage characteristics associated with the laminates produced in accordance with this invention. A series of 8 tests was performed using various resin compositions produced in accordance with this invention. Various amounts of furfural were used in preparation of these resins. The data obtained as a result of this series of tests is summarized in Table III. All the resins used in this example were produced in accordance with Example 1, except as follows. Resin used in tests 15–1 and 15–7 contained 0.5 mole of formaldehyde per mole of furfuryl alcohol during preparation thereof, and had a viscosity of 79,000 cps. at 27° C. after distillation. Resin used in tests 15–2 and 15–6 also contained 0.5 mole formaldehyde per mole furfuryl alcohol at the beginning of the preparation thereof, but had a viscosity too high to be measured by available equipment, that is, in excess of 100,000 cps. The resin used in tests 15–3 and 15–4 was a blend of one part resin produced for test 15–1, and two parts of a resin made in same way with a 0.5 molar ratio, but having an undiluted viscosity of only 2,400 cps. Viscosity of the undiluted blend was 8,300 cps. Resin used in test 15–5 employed no formaldehyde during preparation thereof and had an undiluted viscosity of 47,000 cps. The resin used in test 15–8 was prepared with 1% in the reactants which included 0.5 mole of formaldehyde per mole of furfuryl alcohol. Undiluted viscosity was about 42,000 cps.

The data included in the column headed "percent Cat." indicates the level of PTSA catalyst based on the weight of the resin. The data included in the column headed "Cure" refers to the number of hours cure after stripping in an oven at the temperature indicated. It is noted that there are 3 pairs of columns headed "Cure," and "Shrinkage" the pairs being numbered "I," "II," and "III." This indicates that the shrinkage value set forth was the value observed after the specimen was cured under the conditions set forth in the corresponding cure column.

For the purpose of comparison it might be noted that epoxy resins have been reported (H. L. Parry and H. A. MacKay, 13th Annual Technical and Management Conference, Reinforced Plastics Div., SPI, Section 13–A) to shrink up to 5.75% during cure at 65° C. With diethylene triamine at 25° C., they shrank 4.3%.

In obtaining the data set forth in Example 3, shrinkage was determined by casting bar specimens ½ inch by ½ inch by 5 inches, in a Teflon mold. One side of the mold was removable and resin was poured into the closed mold from an opened end. With highly exothermic systems the specimens were allowed to gel with some cooling, and then to harden overnight. Finally they were cured for the specified number of hours at the temperature indicated. Immediately after removal from the mold, the specimens were measured with micrometers and from time to time the measurements were repeated and the change in volume was calculated. The data set forth in Table III represents the change in volume.

Hence, from the above it will be appreciated that in accordance with this invention laminates and other structures prepared with silica and glass fibers are produced with the result that unusually high structural strength, heat stability, chemical stability, and flame resistance are achieved.

Therefore, we claim:

1. An acid curable binder composition for use with glass-containing materials comprising: a homogeneous mixture of
   (A) a furfuryl alcohol-formaldehyde resin having a viscosity between 10,000 and 200,000 said resin having been prepared by the steps of resinifying in the presence of an acid catalyst furfuryl alcohol and formaldehyde in a molar ratio of between 0.25 and 1.0 mole of formaldehyde per mole of furfuryl alcohol, neutralizing the acid catalyst and removing substantially all the water by distillation, and
   (B) furfural in an amount between 5 and 25 percent by weight based on the weight of the composition, said binder composition having a viscosity between 300 and 5,000 cps. at 77° F.

2. A composition as in claim 1 in which the furfuryl alcohol-formaldehyde resin has a viscosity between 10,000 and 200,000 cps. at 77° F. in which the binder composition containing the furfural has a viscosity between 500 and 1,000 cps.

TABLE III

| Test No. | Percent FCHO | Visc. dil'd | Percent cat. | Cure-I | Shrinkage-I | Cure-II | Shrinkage-II | Cure-III | Shrinkage-III |
|---|---|---|---|---|---|---|---|---|---|
| 15-1 | 25 | 905 | 3 | 2-160° | 2.9 | 22-160° | 3.3 | 22-250° / 22-300° | 4.1 / 4.2 |
| 15-2 | 40 | 200 | 3 | 2-160° | 5.2 | | | | |
| 15-3 | 15 | 825 | 3 | 2-160° | 3.6 | 22-160° | 4.1 | | |
| 15-4 | 20 | 625 | 3 | 2-160° | 4.5 | 22-160° | 5.0 | 22-250° | 5.7 |
| 15-5 | 25 | 800 | 4.5 | 2-160° | 3.2 | 22-160° | 3.5 | 22-250° | 3.7 |
| 15-6 | 30 | 1,015 | 3 | 2-160° | 4.9 | 22-250° | 5.6 | | |
| 15-7 | 25 | 905 | 3 | 2-160° | 3.2 | 22-160° | 3.6 | | |
| 15-8 | 20 | 1,000 | 3 | 2-160° | 3.7 | 22-160° | 4.3 | 22-260° | 5.3 |

References Cited

UNITED STATES PATENTS 2,803,618   8/1957   Harney _____ 260—30.4

MORRIS LIEBMAN, Primary Examiner

S. M. PERSON, Assistant Examiner

U.S. Cl. X.R.

260—30.4 R